US011795672B2

(12) United States Patent
Eilmus et al.

(10) Patent No.: US 11,795,672 B2
(45) Date of Patent: Oct. 24, 2023

(54) SMART SINK

(71) Applicant: Kohler Co., Kohler, WI (US)

(72) Inventors: Niels J. Eilmus, Sheboygan, WI (US); Rafael A. Rexach, Sheboygan, WI (US); Kristin S. Morehouse, Sheboygan, WI (US); Steven F. Ellingsen, Plymouth, WI (US)

(73) Assignee: Kohler Co., Kohler, WI (US)

(*) Notice: Subject to any disclaimer, the term of this patent is extended or adjusted under 35 U.S.C. 154(b) by 141 days.

(21) Appl. No.: 16/710,307

(22) Filed: Dec. 11, 2019

(65) Prior Publication Data
US 2020/0199858 A1 Jun. 25, 2020

Related U.S. Application Data

(60) Provisional application No. 62/784,011, filed on Dec. 21, 2018.

(51) Int. Cl.
E03C 1/182 (2006.01)
G06F 3/16 (2006.01)

(52) U.S. Cl.
CPC .............. *E03C 1/182* (2013.01); *G06F 3/165* (2013.01)

(58) Field of Classification Search
CPC ..... E03C 1/14; E03C 1/16; E03C 1/18; E03C 1/182; E03C 1/184; E03C 1/00; A47K 1/00; A47B 77/06; F21V 33/004
See application file for complete search history.

(56) References Cited

U.S. PATENT DOCUMENTS

| 4,809,369 | A | 3/1989 | Bowden | |
| 5,868,311 | A * | 2/1999 | Cretu-Petra | E03C 1/057 4/623 |
| 8,683,624 | B1 | 4/2014 | Zhadanov et al. | |
| 9,578,994 | B2 | 2/2017 | Capp et al. | |
| 10,369,578 | B2 | 8/2019 | Allard | |
| 10,501,919 | B2 * | 12/2019 | Chong | A47B 77/06 |
| 2007/0174958 | A1 | 8/2007 | McKay, Jr. | |
| 2008/0271238 | A1 * | 11/2008 | Reeder | A46B 7/04 4/597 |
| 2010/0254125 | A1 * | 10/2010 | Jones, III | E03C 1/186 362/227 |

(Continued)

FOREIGN PATENT DOCUMENTS

| CA | 3083422 A1 | 6/2019 |
| CN | 2518919 Y | 10/2002 |

(Continued)

OTHER PUBLICATIONS

First Chinese Office Action for CN Appl. Ser. No. 201911335966.X dated Sep. 23, 2020 (11 pages) (English Translation).

(Continued)

*Primary Examiner* — Erin Deery
(74) *Attorney, Agent, or Firm* — Patterson Thuente, P.A.

(57) ABSTRACT

Disclosed is a sink assembly including a basin, an apron, and an apron module. The basin includes a floor and a plurality of sidewalls extending upwardly from the floor. The floor and the plurality of sidewalls together define a reservoir configured to receive fluid therein. The apron module is disposed within the volume and includes an audio system. The apron module may be sized to be fully received within the volume.

19 Claims, 12 Drawing Sheets

(56) References Cited

U.S. PATENT DOCUMENTS

| | | | |
|---|---|---|---|
| 2012/0124737 A1 | 5/2012 | Gibson | |
| 2018/0187403 A1 | 7/2018 | Chong et al. | |
| 2018/0292079 A1* | 10/2018 | Branham | F21V 33/004 |

FOREIGN PATENT DOCUMENTS

| | | | |
|---|---|---|---|
| CN | 201683348 | | 12/2010 |
| CN | 201891204 | | 7/2011 |
| CN | 202190986 | | 4/2012 |
| CN | 202298800 | | 7/2012 |
| CN | 103502542 | | 1/2014 |
| CN | 203627979 | | 6/2014 |
| CN | 105839719 | | 8/2016 |
| CN | 106617873 | | 5/2017 |
| CN | 106617873 A * | 5/2017 | |
| CN | 107313482 | | 11/2017 |
| CN | 206616755 | | 11/2017 |
| CN | 207640863 | | 7/2018 |
| CN | 208650177 | | 3/2019 |
| JP | 2003079528 A * | 3/2003 | |
| JP | 2016179173 A * | 10/2016 | F21V 33/004 |
| WO | WO-2012/033350 A2 | 3/2012 | |

OTHER PUBLICATIONS

Chinese Second Office Action CN Application No. 201911335966.X dated Jan. 26, 2021 9 pages.

Extended European Search Report for Application No. 19217790.5 dated Apr. 22, 2020.

Hansgrohe, "Aquno Select HighArc Kitchen Faucet, 3-Spray Pull-Down, 1.75 GPM," retrieved from https://www.hansgrohe-usa.com/articledetail-aquno-select-higharc-kitchen-faucet-3-spray-pull-down-1-75-gpm-73837801, 3 pages (2021).

Kohler, "Crevasse Preparation Sink K-6448," retrieved from https://www.us.kohler.com/us/Crevasse-35-5-8-x-8-1-8-x-7-3-8-undermount-single-bowl-bar-sink-with-Cynchronus-rinsing-technology/productDetail/product:426585/426585.htm, 2 pages (2021).

Gizmodo, Ceiling-Mounted Bathroom Faucet Would be Great for Quick Showers. 2009. https://gizmodo.com/ceiling-mounted-bathroom-faucet-would-be-great-for-quic-5390931.

Extended European Search Report on EP Appl. Ser. No. 21186904.5 dated Mar. 3, 2022 (10 pages).

European Examination Report on EP Appl. Ser. No. 19217790.5 dated Mar. 3, 2022 (5 pages).

* cited by examiner

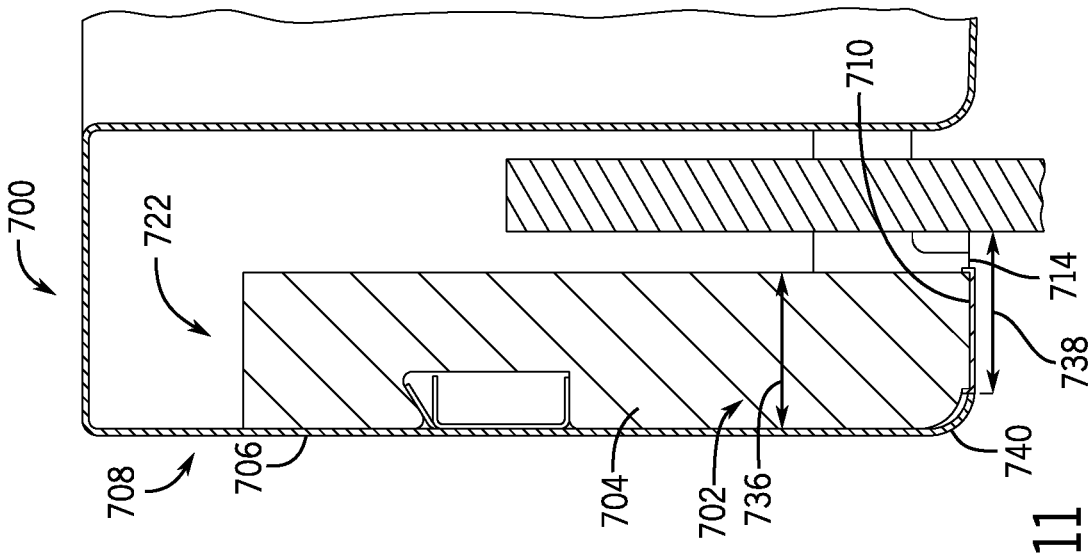
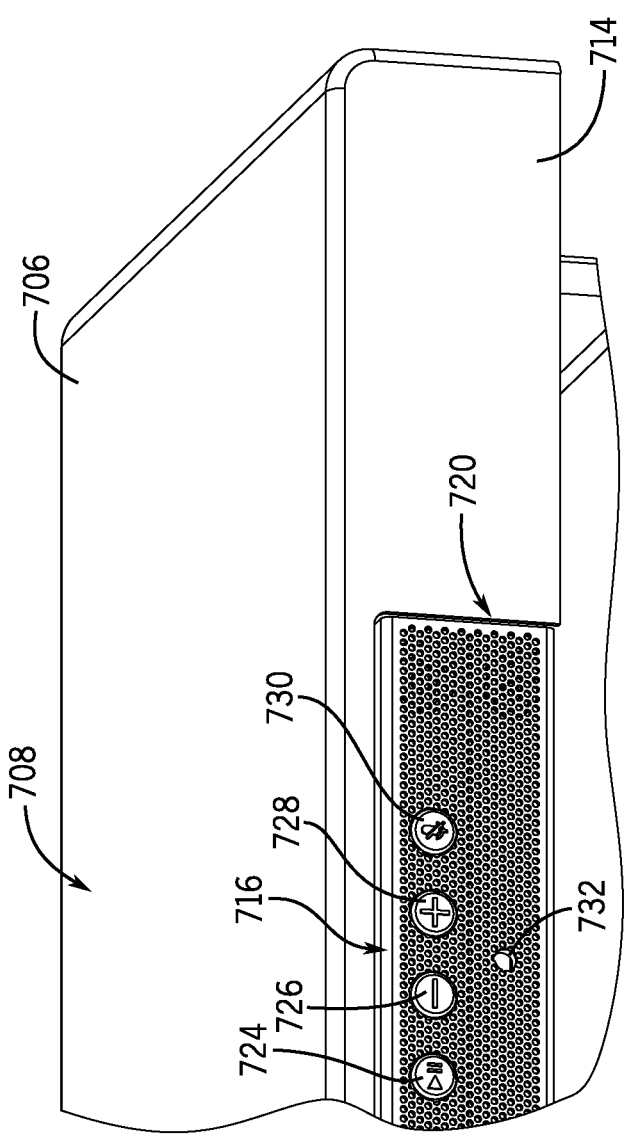
FIG. 11
FIG. 10

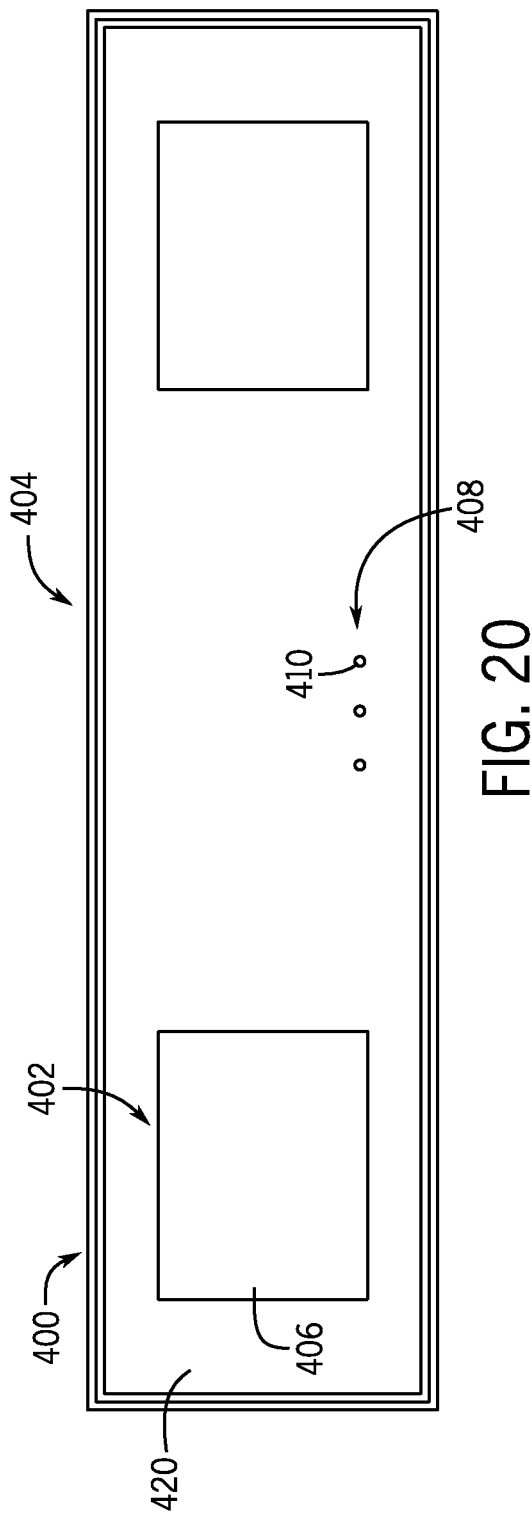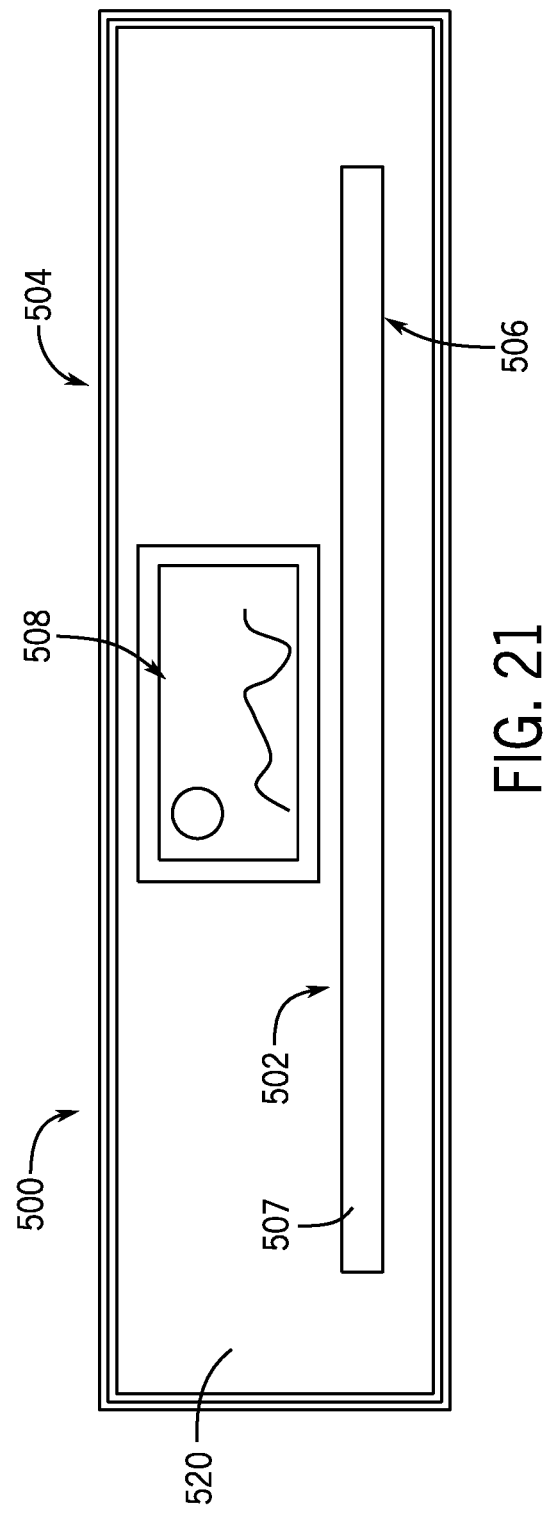

SMART SINK

CROSS-REFERENCE TO RELATED PATENT APPLICATIONS

This application claims the benefit of and priority to U.S. Provisional Application No. 62/784,011, filed Dec. 21, 2018, the entire disclosure of which is hereby incorporated by reference herein.

BACKGROUND

The present application relates generally to the field of wash receptacles such as sinks and the like. Sinks are vessels generally configured for receiving water in a kitchen, bathroom, or other environment. Usually, a faucet or other water source is located proximate to the sink, and a drain pipe is coupled to the sink to remove unwanted water. A sink is often mounted on or into a cabinet, stand, or pedestal.

SUMMARY

One exemplary embodiment relates to a sink assembly. The sink assembly includes a basin, an apron, and an apron module. The basin includes a floor and a plurality of sidewalls extending upwardly from the floor. The floor and the plurality of sidewalls together define a reservoir configured to receive fluid therein. The apron module is disposed within the volume and includes an audio system. In some embodiments, the apron module may be sized to be fully received within the volume.

In some embodiments, the apron includes a top flange extending outwardly from a top portion of a front sidewall and a forward wall extending downwardly from the top flange. The apron module may be coupled to the forward wall.

Another exemplary embodiment relates to an apron module. The apron module includes a housing and an audio device. The housing includes a housing body that defines an at least partially enclosed space. The housing is configured to be disposed within a volume formed between a front sidewall of a basin of the sink assembly and an apron of the sink assembly. The audio system is coupled to the housing body and disposed substantially within the enclosed space.

In some embodiments, the apron module is sized to be fully received within the volume. In some embodiments, the housing further comprises a grill that is mechanically connected to the housing body. The grill may configured to define a portion of a lower wall of the apron when the apron module is engaged with the sink assembly.

BRIEF DESCRIPTION OF THE DRAWINGS

FIG. 10 is a bottom perspective view of an apron of the smart sink of FIG. 8.

FIG. 11 is a side cross-sectional view through an apron of a smart sink, according to an exemplary embodiment.

FIG. 20 is a front view of a smart sink, according to another exemplary embodiment.

FIG. 21 is a front view of a smart sink, according to another exemplary embodiment.

DETAILED DESCRIPTION

Figure 1:
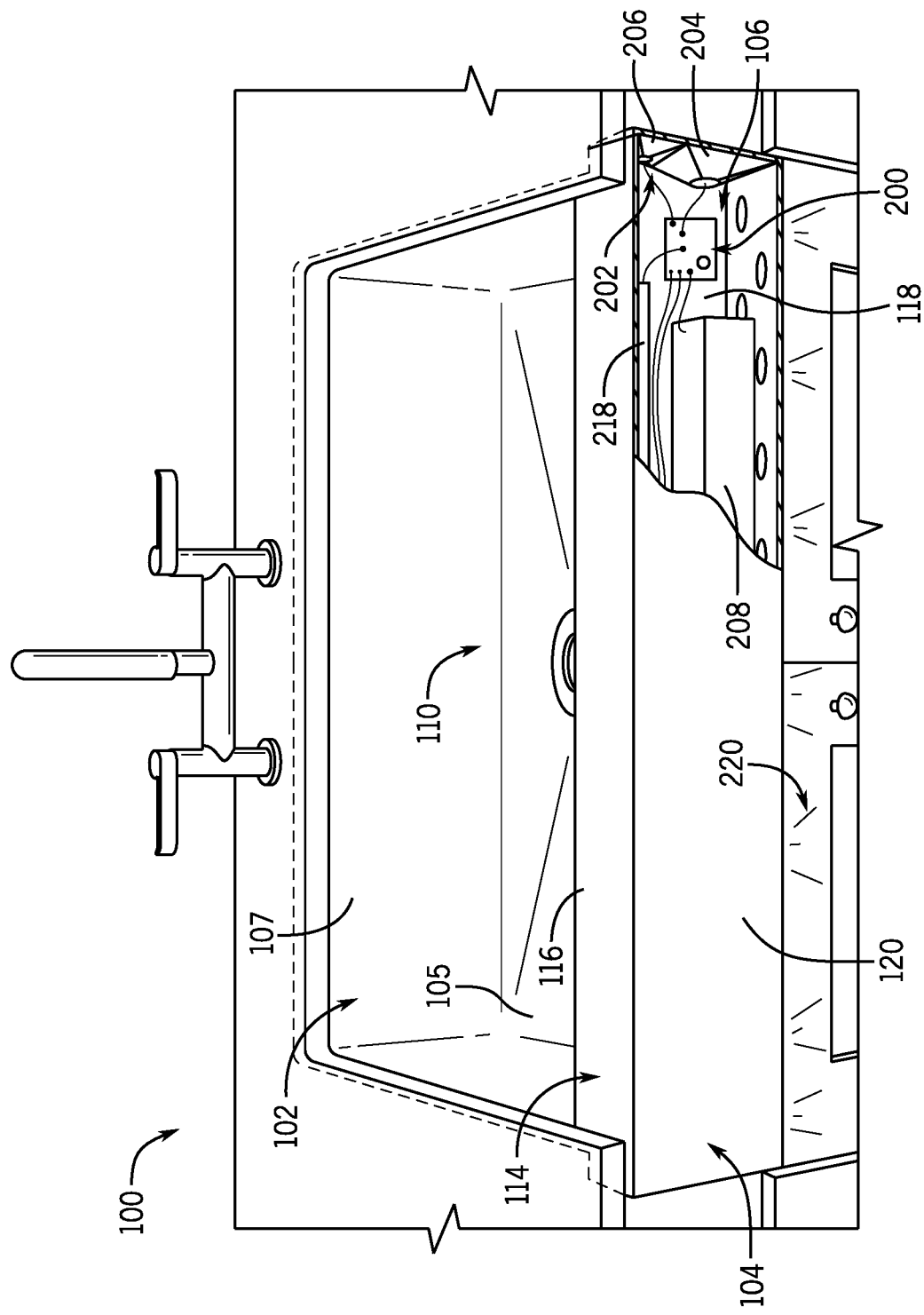
FIG. 1 is a partial cross-sectional view of a smart sink installed in a countertop, according to an exemplary embodiment.

Embodiments of the present disclosure relate to sinks that include integrated electronic components such as sound systems and Internet-connected digital assistants.

Sinks may be made from a wide variety of materials, including stainless steel, copper, enameled cast iron, ceramic materials, engineered stone, polymers, composite materials, and others. The size, shape, and configurations of sinks may vary according to a wide variety of factors. One particular style of sink is referred to as an "apron-front sink." Apron-front sinks, which include farmhouse-style sinks, have an exposed panel or "apron" that extends laterally across a front portion of the sink. In some cases, the apron may be generally hollow, which advantageously provides weight and material savings.

It may be desirable in some environments where a sink is present to also utilize certain electronic devices such as music systems, virtual assistants (such as the Amazon Alexa® product, the Google Assistant, and the like), and other useful systems. Typically, such electronic systems are either placed on a nearby surface (e.g., a countertop, cabinet, etc.) or mounted in other locations. However, certain users may not wish to have a cluttered appearance in the environment, and so it may be desirable to find other locations for such devices.

It would be advantageous to provide an improved system that allows for the use of electronic devices such as music system, virtual assistants, and the like within environments such as kitchens, bathrooms, and the like, while maintaining the desired aesthetic of the space.

One embodiment of the present disclosure relates to a sink including a basin and an apron. The sink includes a speaker coupled to the apron and contained at least partially within a volume defined by the apron.

Another embodiment of the present disclosure relates to an apron module configured to be coupled to a sink. The apron module includes a control system including a processor and a user interface operably coupled thereto. The apron module is communicatively coupled to a sink device and is configured to operate the sink device. The sink device is coupled to the sink.

Referring generally to FIGS. 1-23, a sink is shown according to various exemplary embodiments that includes one or more electronic components that may allow the sink to provide music, virtual assistant functionality, and other features. In this manner, the sink may act as an information or data hub for the environment in which the sink is placed, and may provide music and/or other sounds or visual indications to a user. For ease of reference in the present disclosure, such a sink will be referred to as a "smart sink" to denote the fact that the sink includes functionality beyond typical sinks that simply act as receptacles for water, dishes, and the like that may be provided within the sink basin.

According to an exemplary embodiment, the smart sink is configured to output sound. The sink may also be configured to receive and interpret user commands and to control wired or network-connected devices. In some embodiments, the smart sink includes a display (e.g., a monitor, a touch-screen display, etc.). Among other benefits, the smart sink integrates functionality of multiple devices (e.g., stereos, artificial intelligence (AI) assistant devices, etc.) in a centralized location within the kitchen space.

According to an exemplary embodiment, the smart sink includes a basin and an apron. In some embodiments, the smart sink is a non-apron-front sink (e.g., the sink includes only one or more basins, one or more basins and a rim channel, or another sink arrangement known to those of ordinary skill in the art). The smart sink additionally includes an apron module. The apron module is coupled to the sink and includes one or more electronic components configured to provide enhanced functionality for the sink. In some embodiments, the apron module is disposed within a volume at least partially defined by the apron (e.g., an apron area of the sink that is adjacent to a forward sidewall of the sink, between an apron and a cabinet that at least partially surrounds the sink, etc.). In other embodiments, the apron module is disposed in other parts of the sink (e.g., below the sink, in a saddle or partition between basins, or in another location).

According to one exemplary embodiment, the apron module includes one or more components or devices that are configured to control local devices, coupled to the sink, within the sink ecosystem (e.g., a faucet, a garbage disposal, soap dispensers, water filtration, etc.).

According to another exemplary embodiment, the apron module may include one or more components or devices that are configured to control other components outside of the sink ecosystem. For example, the apron module may be configured to control lighting within the kitchen, lighting in other rooms of a building, speakers in other rooms of the building, and other network-connected devices. Such "smart home" features may be controlled through virtual assistants, and such virtual assistants may therefore be included in the apron module. Additionally, it should be noted that the same component(s) in the apron module may be configured to control both local devices coupled to the sink as well as other components outside the sink.

In some embodiments, the apron module includes one or more audio components such as speakers, subwoofers, radios, stereo systems, and the like. The audio components may be contained at least partially within a volume defined by the apron (e.g., in an open space behind the front surface of the apron, which may potentially be enclosed or accessible from the rear of the apron, or from beneath the apron). Among other benefits, utilizing the space within the apron may help to conceal the apron module and improve the overall aesthetic appearance of the smart sink. In some implementations, the audio components may be configured to project sound through openings in a wall of the apron (e.g., a bottom wall, a front sidewall, and/or a side wall). According to one exemplary embodiment, the apron module includes one or more indicators or light sources. The light source(s) may be configured, for example, to illuminate a region below the apron (e.g., surfaces of cabinets and/or kitchen hardware proximate to the smart sink). In other embodiments, the light source may be configured to illuminate other parts of the sink (e.g., a sink basin, etc.).

Referring now to FIG. 1, a sink 100 is shown according to an exemplary embodiment. The sink 100 may be installed in various environments such as a kitchen or bathroom. The sink 100 generally includes one or more basins 102 and an apron 104. The basin 102 may include a floor 105 and one or more sidewalls 107 extending upwardly from the floor 105. The floor 105 and sidewalls 107 at least partially define a reservoir 110 that is configured to receive a fluid (e.g., water from a faucet, etc.) therein. A rim may extend from a top portion of the sidewalls 107 and define a rim plane 114. The apron 104 is shown to have a top flange 116 which extends outwardly from a top portion of a front sidewall 118 and to have a forward wall 120 which extends downwardly from the top flange 116. As shown, the forward wall 120 of the apron 104 is substantially perpendicular to the rim plane 114. The forward wall 120 is spaced apart from the front sidewall 118 to form a volume 106 (e.g., an at least partially enclosed volume, a cavity, a hollow region, etc.). The apron 104 generally extends laterally across a front portion of the sink 100. As shown in FIG. 1, the volume 106 is further defined by the top flange 116. In some embodiments, the volume 106 extends outward beyond a forward surface of the cabinets into which the sink 100 is disposed. In other embodiments, the volume 106 may be at least partially inset behind the forward surface of the cabinets. In some embodiments, the forward wall 120 of the apron 104 may be curved.

The sink 100 may have any number of basins 102. For example, the sink 100 may have one, two, or more basins 102. In the embodiment of FIG. 1, the sink 100 has a single basin. Alternatively, the sink 100 may have a single basin 102 divided into two or more reservoirs. The basins 102 or reservoirs may be separated by one or more saddles (e.g., divider, separator, structure, hump, ridge, etc.). The saddle (not shown) may be of any height. Usually a top of the saddle remains below the rim plane of the sink 100. The saddle may divide sink 100 into multiple equal or unequal sized basins 102 or reservoirs.

The sink 100 may be made from a number of different materials including, but not limited to, including stainless steel, neoroc, copper, enameled cast iron, ceramic materials (e.g., vitreous materials), engineered stone, polymers, composite materials, and other materials.

Before discussing further details of the sink, it should be noted that references to "front," "back," "rear," "upper," "lower," "right," and "left" in this description are merely used to identify the various elements as they are oriented in the FIGURES, with "right," "left," "front," "back," and "rear" being relative to a user facing the sink, and with "lateral" being left-right as viewed by the user. These terms are not meant to limit the element which they describe, as the various elements may be oriented differently in various applications.

It should further be noted that for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As shown in FIG. 1, the sink 100 includes an apron module 200. The apron module 200 is configured, in part, as an entertainment and/or information system for a user of the sink 100 or other individuals within the vicinity of the sink. As shown in FIG. 1, the apron module 200 is fully contained within the volume 106 of the apron 104. The apron module 200 is coupled to the apron 104, which may advantageously improve the overall aesthetic appearance of the device. In some embodiments, the apron module 200 may be a pre-assembled insert that fits through the lower wall or side wall of the apron, as will be further described. The insert may include a housing or mounting member to which the components of the apron module 200 are coupled. The housing may be detachably coupled (e.g., removably coupled) to the sink 100, within the volume of the apron 104, or in another location on the sink 100. The housing may form part of the lower wall of the apron 104 and may include fasteners (e.g., clips, tabs, etc.) that engage with at least one of the front sidewall, front surface, or side walls of the apron 104.

Figure 2:
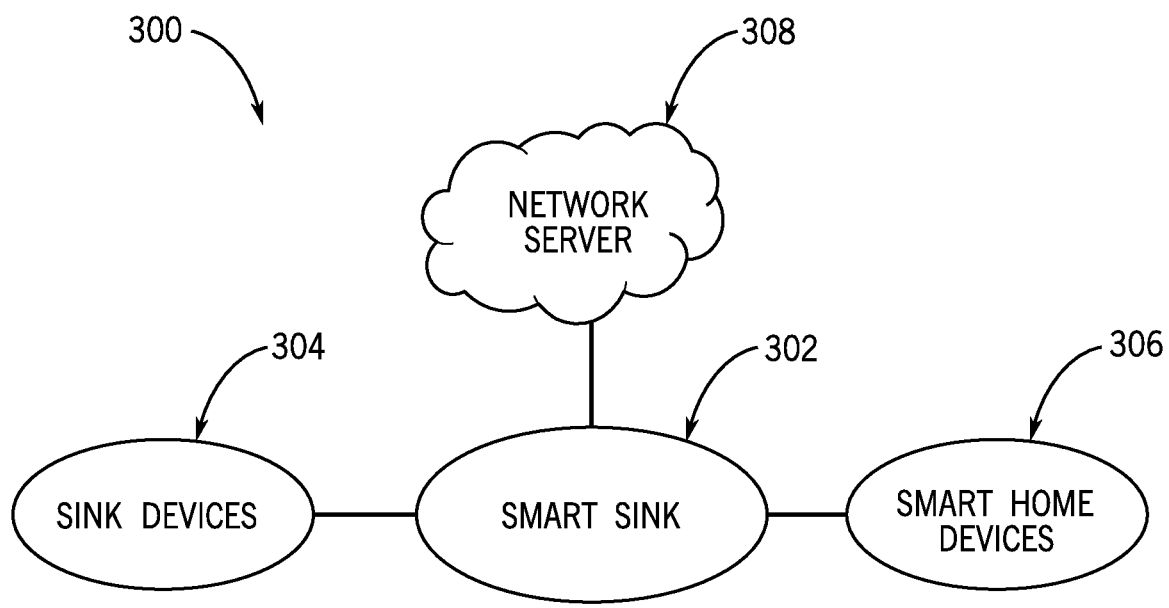
FIG. 2 is a block diagram of a sink and home control system, according to an exemplary embodiment.

Referring now to FIG. 2, a block diagram of a sink and home control system 300 is shown according to an exemplary embodiment. As shown in FIG. 2, the system 300 includes the sink 100 and apron module 200, shown together as smart sink 302. The system 300 additionally includes one or more sink devices 304, one or more smart home devices 306, and a network server 308 (e.g., cloud). Each of the devices 304, 306, and network server 308 are communicatively coupled to the smart sink 302.

According to an exemplary embodiment, each of the sink devices 304 are coupled to (e.g., mounted to or otherwise connected to) the sink (e.g., the sink 100 of FIG. 1). The sink devices 304 may form part of a sink ecosystem configured to facilitate cleaning operations within the sink. The sink devices 304 may include a faucet, a garbage disposal, a soap dispenser (e.g., a hand dispenser, and automatic dispenser for washing dishes, etc.), a water filtration system, a self-cleaning sink mechanism (e.g., a UV light disposed along an upper edge of the basin and directed toward the basin), a dish rinsing device (e.g., a hand sprayer, etc.), and/or other sink accessories. The sink devices 304 may additionally include "smart" appliances in the vicinity of the sink and/or kitchen area such as coffee makers, microwaves, refrigerators, dishwashers, etc. The smart sink 302 may be hard-wired to the sink devices 304 or wirelessly connected to the sink devices 304 (e.g., via Wi-Fi, Bluetooth, or another wireless communications protocol).

According to an exemplary embodiment, the smart sink 302 may be configured for bi-directional communication with the sink devices 304. For example, the smart sink 302 may be configured to receive diagnostic data from one or more sink devices 304 (e.g., a condition of a water filter, a fill status of a soap dispenser, etc.), and to take action based on the data received. For example, the smart sink 302 may be configured to receive a control signal from a water filtration system indicating the water filter needs to be replaced (e.g., that a given period of time has elapsed since the water filter was replaced, etc.). The smart sink 302, in response to the control signal, may be configured to cause a notification to be generated alerting a user that the water filter needs to be replaced. In some implementations the smart sink 302 is configured to receive sensor data from one or more sensors (e.g., flow sensors, temperature sensors, etc.).

As shown in FIG. 2, the system 300 includes one or more smart home devices 306. The smart home devices 306 include home automation devices such as room lighting, wireless speaker systems, environmental control systems (e.g., heating, ventilation, and air conditioning systems, etc.), garage door systems, security systems, and other "smart" devices. According to an exemplary embodiment, the smart home devices 306 may include AI assistant devices (e.g., Google Home, Amazon Echo, and other smart hubs). Among other benefits, integrating these "smart" devices with the smart sink 302 centralizes control to a single device within the kitchen area, and allows a user to multitask (e.g., to control other components within the kitchen or building) while using the sink 100 (see also FIG. 1). As with the sink devices 304, the smart sink 302 may be hard-wired to the smart home devices 306 or wirelessly connected to the smart home devices 306 (e.g., via Wi-Fi, Bluetooth, or another wireless communications protocol).

In some embodiments, the smart sink 302 provides the functionality of a traditional "smart" speaker that is part of a networked audio solution. For example, the smart sink 302 may be configured for bi-directional communication with a remote computing device (e.g., a mobile phone, a laptop computer, a tablet, etc.) and configured to transmit and/or receive audio data from the computing device (e.g., via Wi-Fi, Bluetooth, or another wireless communications protocol). The smart sink 302 may be configured to control an onboard speaker to generate sound based on the audio data received from the remote computing device. In other embodiments, the smart sink 302 may be configured to transmit and/or receive audio data from other "smart" speakers (e.g., Sonos® One, etc.) located remotely from the smart sink 302 and coordinate operation with the other "smart" speakers. For example, the smart sink 302 may form part of a plurality of wireless speaker devices located throughout the building and configured to stream music over a wireless network within a building (e.g., similar to Apple Airplay, etc.).

The smart sink 302 may provide the functionality of a traditional "smart" hub or AI assistant to any user or individuals within the area near the sink. The smart sink 302 may include an AI assistant. A user may issue verbal commands to the smart sink 302. For example, the user may ask the smart sink 302 to "drop in" on children or other individuals within the building (e.g., "hey Alexa, tell the kids it's time to eat"). The functionality of the smart sink 302 may be illustrated, in part, by way of any of the following examples:

Example 1. While rinsing dishes in sink and loading dishwasher, a user notices water starting to slow to while their hands are busy loading dishes and asks the smart sink 302 to "run my garbage disposal" to activate a garbage disposal;

Example 2. While prepping veggies, a user asks the smart sink 302 to turn off the TV so the kids will come and do their chores;

Example 3. A user asks the smart sink 302 to add things to a grocery list or other lists, while the user is performing other kitchen operations (e.g., washing dishes, cooking, etc.);

Example 4. A user working in the vicinity of the smart sink 302 asks the smart sink 302 to set timers for cooking, "timeouts", potty reminders for a toddler, a length of time to practice an instrument, and/or timers for other activities;

Example 5. A user asks the smart sink 302 to turn off lights in a room of the house other than the kitchen;

Example 6. A user asks the smart sink 302 to play music through a streaming music service (e.g., Amazon music, etc.) for entertainment during cooking, dining, preparing Christmas cookies, etc.;

Example 7. A user, occupied with cleaning food in the sink, asks the smart sink 302 to answer a phone call that is received through a household phone line;

Example 8. A user asks the smart sink 302 to set a reminder for 4 PM to pick up their kids from an after-school program;

Example 9. A user issues a verbal command to the smart sink 302 to "start Christmas" to activate Christmas lights and garland throughout the house;

Example 10. A user asks the smart sink 302 to switch TV from a cable setting to DVD;

Example 11. A user asks the smart sink 302 to report and adjust a room temperature (e.g., "reset the temperature in the Kitchen two degrees higher");

Example 12. A user issues a verbal command to the smart sink 302 to "walk me through the recipe," while cooking in the kitchen or to "skip to the next step in the recipe;"

Example 13. While cooking, a user asks the smart sink 302 for conversions or substitutes;

Example 14. A user asks the smart sink 302 to activate or deactivate a remote cleaning device (e.g., "ask Roomba to pause cleaning");

Example 15. A user asks the smart sink 302 to run a pre-defined set of tasks associated with a single verbal command (e.g., "light it up" to activate lights throughout the home);

Example 16. A user asks the smart sink 302 to activate a Sonos® One or another type of "smart" voice speaker in a living room area of a house;

Example 17. A user asks the smart sink 302 what the weather is or what's on their calendar for the day;

Example 18. A user voice dials 911 from an area near the sink so that the user may focus their efforts comforting an injured individual or putting pressure on limbs to prevent blood loss or doing chest compressions;

Example 19. A user asks the smart sink 302 from the kitchen while going through the mail, the status, location, etc. of their orders from an internet shopping service (e.g., Amazon Prime);

Example 20. A user reorders items that the user has previously purchased by issuing a verbal command to the smart sink 302 (such decisions may typically be made in a kitchen space);

Example 21. The smart sink 302 reports TV viewing, and screen time for wireless devices through their Circle with Disney device in response to a user issued command; the user asks the smart sink 302 to pause data on their children's devices or to automatically pause data in response to the time exceeding a given threshold value;

Example 22. A user asks the smart sink 302 to show their photos as a slideshow; in response, the smart sink 302 pulls the user's photos (e.g., stored in memory, or from a wireless service such as Amazon Photos) and presents a screensaver of their photos and/or music through a TV in another part of the house;

Example 23. While standing at sink, a user asks the smart sink 302 to play "fireball" in their children's room to help inspire them to get out of bed; the smart sink 302 may additionally activate lights in their room;

Example 24. The smart sink 302 is linked to a smart faucet; a user asking the smart sink 302 to "fill a stock pot;" in response to the user request, the smart sink 302 fills the stock pot to the right amount while the user walks away and/or performs other tasks;

Example 25. The smart sink 302 is linked to a smart faucet or smart beverage station; the user requests a type of water (e.g., filtered, hot, sparkling, etc.) or a specific temperature of water in addition to a volume of water to be allocated;

Example 26. The smart sink 302 performs a routine in response to a single user command; a user asks the smart sink 302 to "clean up my sink space," prompting the smart sink 302 to turn on water faucet for 30 seconds, run a garbage disposal for one minute, stop the disposal, continue water running at 30 seconds and then shutoff faucet; the smart sink 302 could also rinse the sink, or be configured by a user to automatically run a sinkbox after dark with the user is at rest;

Example 27. The user asks the smart sink 302 to "start my day," prompting the smart sink 302 to activate a faucet to automatically fill a coffee pot (that's left in sink) with a given volume of filtered water at 6 AM to prepare the pot for use or to automatically start a coffee pot that has water in it; in addition, the smart sink 302 could tell you the weather and your schedule for the day; the smart sink 302 could start your shower and provide a temperature at which the shower should be adjusted to (e.g., "turn on the shower to 94°") so that by the time you make it to the shower your water is already at the perfect temperature;

Example 28. The smart sink 302 forms part of a "smart" home; the smart sink 302 unlocks a front door or opens a garage door in response to a user command, while the user is in the kitchen;

Example 29. The smart sink 302 is linked to lighting within the sink (e.g., soft nightlight or task prep lights in the sink) and activates the lights or adjusts a light setting in response to a user's command;

Example 30. The smart sink 302 is linked to a sink bot or another cleaning appliance and controls the sink bot in response to a verbal user command ("sink bot awake" to activate the device, or "sink bot pause" to at least temporarily halt operation);

Example 31. The smart sink 302, linked to a toilet in a bathroom, issues a flush command to the toilet in response to a flush command (e.g., "flush the upstairs toilet");

Example 32. The smart sink 302, linked to a speaker in a children's room, activates the speaker and projects a user's voice through the speaker ("kids, it's time to come downstairs to eat");

Example 33. The smart sink 302 includes scenes or pre-defined kitchen light or music settings in memory, and activates the scene at a given time (e.g., dinner time, 6 PM, etc.) or in response to a user command ("let's eat"); in response to the user command the kitchen lights may dim and the lights in a dining room area may brighten while soft music begins to play;

Example 34. The smart sink 302 provides, through audible indication (e.g., voice from a speaker), an amount of time remaining on a washer or dryer cycle so that the user can plan their cooking tasks so that they can run up to grab clothes before they become wrinkled with minimal disturbance to cooking activities;

Example 35. The smart sink 302 reports information from an internet search to a user ("how long can raw chicken stay in the fridge," etc.);

Example 36. The smart sink 302 is communicatively coupled to a "smart" refrigerator; the smart sink 302 provides to a user a list of food items that are locating in the refrigerator (e.g., "are there eggs in the fridge?" to which the smart sink 302 may reply "yes, there are one dozen eggs remaining on the top shelf in the refrigerator"); and Example 37. The smart sink 302 is configured to operate a direct injected garbage disposal as part of a cleanup routine; the direct injected garbage disposal includes a hinged flap with a magnet on one side of it; the flap flips closed when an electromagnetic collar between the sink and the garbage disposal is energized (in response to a user command to "start garbage disposal"), thus flipping the cover closed while the disposal is in operation; the flap may be weighted so that it returns to an open position when the electromagnet is no longer powered; among other benefits, this feature eliminates the splash of water/food that sometimes occurs when the disposal is full and spits out dirty water at disposal startup and minimizes the risk of injury to a user; the device also reduces operating noise of the disposal.

The foregoing examples are provided for illustrative purposes only. User commands (e.g., verbal or otherwise) and number, arrangement, and type of linked devices may be different in various exemplary embodiments.

As shown in FIG. 2, the system 300 additionally includes a network server 308, remote computing device (e.g., mobile phone, desktop computer, tablet, etc.), or other cloud computing device. The smart sink 302 is configured to transmit data to the network server 308 (e.g., via Wi-Fi, Bluetooth, or another wireless communications protocol). The data may include control parameters for the smart sink 302, personalization settings for the smart sink 302, user reminders, sensor and diagnostic data from one of the sink devices 304 and/or smart home devices 306, and other information. The smart sink 302 is also configured to receive and interpret data from the network server 308. Examples of data that may be received from the server 308 include software updates for the smart sink 302 to enable additional features and/or optimize system performance.

Figure 3:
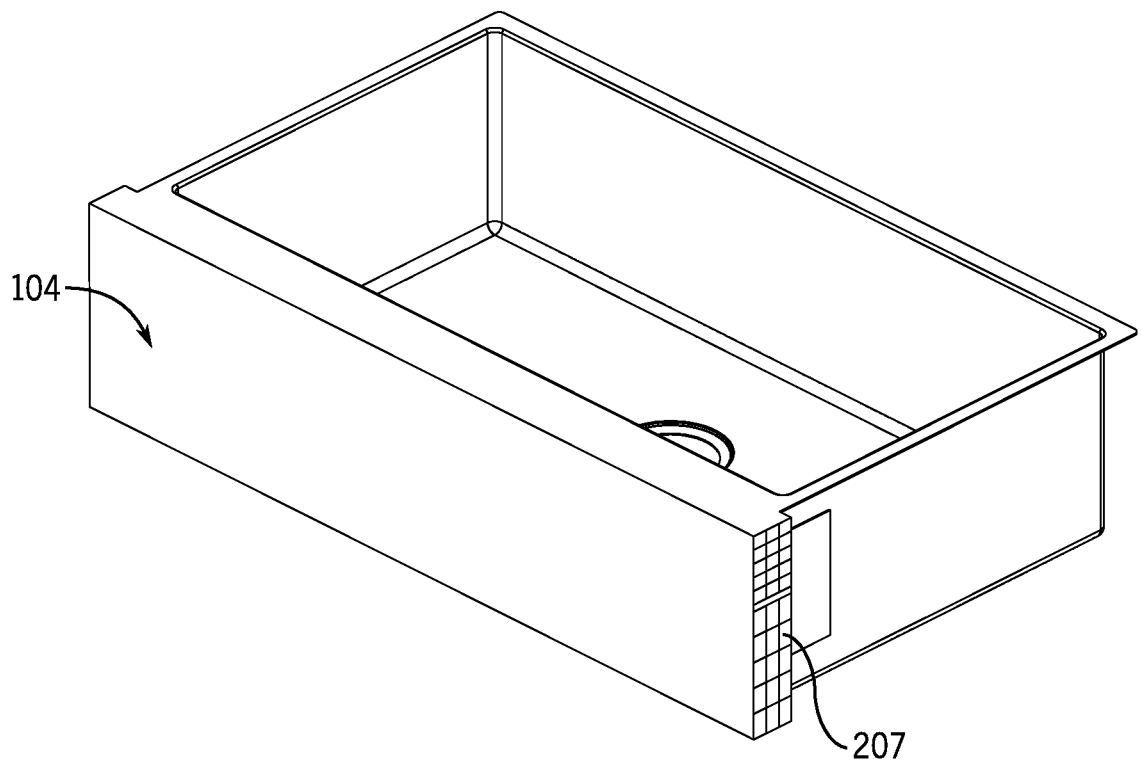
FIG. 3 is a front perspective view of the smart sink of FIG. 1, according to an exemplary embodiment.

Returning to FIG. 1, the apron module 200 includes an audio system, shown as speaker system 202. The speaker system 202 may include Wi-Fi connected speakers, which can utilize technology that is similar, but not limited to, Google Chromecast Audio, Apple Airplay 2, Amazon Multi-Room Music, and Wisa Wireless Speaker & Audio. In other words, the speaker system may be a wireless speaker that can generate sound based on audio data received from a remote computing device and/or another wirelessly connected speaker. According to an exemplary embodiment, the speaker system 202 includes a mid-range speaker 204, a tweeter 206, and a subwoofer 208. In other embodiments, the apron module 200 includes a surface transducer structured to generate sound by vibrating a surface (e.g., a surface of the sink 100 of FIG. 1, etc.) or another type of sound driver. As shown in FIG. 1, both the mid-range speaker 204 and the tweeter 206 are disposed in a side wall of the apron 104 (e.g., at each lateral end of the front surface, extending between the front surface of the apron 104 and the front sidewall of the basin 102). In other embodiments, the speaker system 202 may include additional, fewer, and/or different components, and the various components may be positioned differently. As shown in FIGS. 1 and 3, both the mid-range speaker 204 and the tweeter 206 are configured to project sound outward (e.g., laterally outward, etc.) from the side wall of the apron 104, into the surrounding environment. In other embodiments, the speakers may be oriented to project sound downward from the apron 104, outward at a directed angle, or directly out of the top (e.g., the top flange 116) or front (e.g., the forward wall 120) of the apron 104. In some embodiments, as shown in FIG. 3, the speaker system 202 includes a grill 207 (e.g., a speaker grill, mesh covering, etc.) that at least partially defines the side wall of the apron 104. Such grills may be used at any suitable location in the apron 104 to allow sound to be directed from the speaker system.

Figure 4:
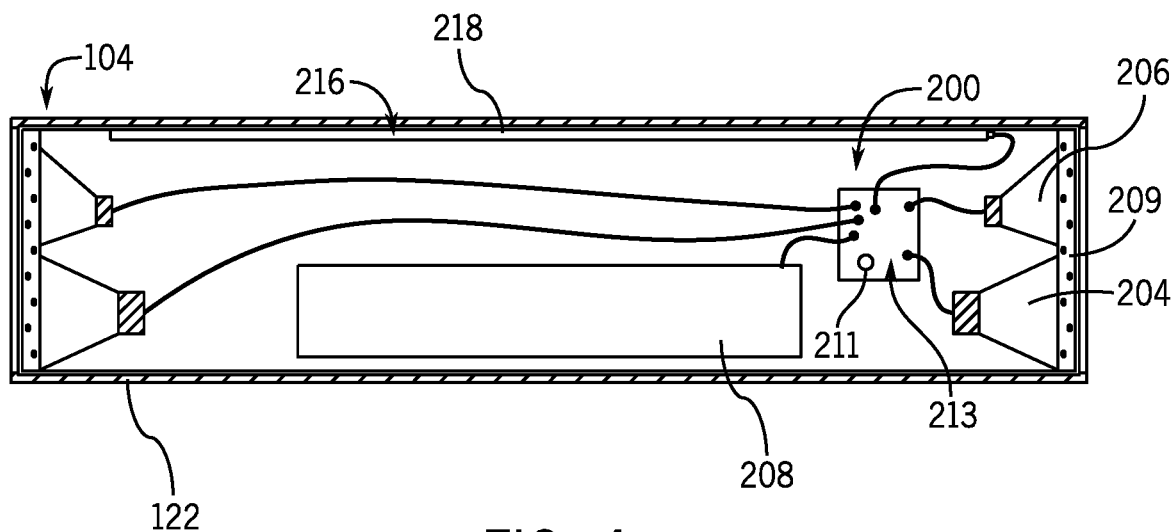
FIG. 4 is a front cross-sectional view of the smart sink of FIG. 1, according to an exemplary embodiment.

Referring now to FIG. 4, a cross-sectional view through the forward wall 120 (see also FIG. 1) of the apron 104 is shown, according to an exemplary embodiment. As shown in FIG. 4, the tweeter 206 is disposed above the mid-range speaker 204. In other embodiments, the arrangement of speakers may be different. The apron module 200 includes an insulating material 209 (e.g., gaskets, spacers, etc.) to prevent the speakers from vibrating against the apron 104. The insulating material 209 may include a soft compliant material (e.g., rubber, felt, etc.). The insulating material 209 may also improve the quality of sound from the speaker system 202.

Figure 5:
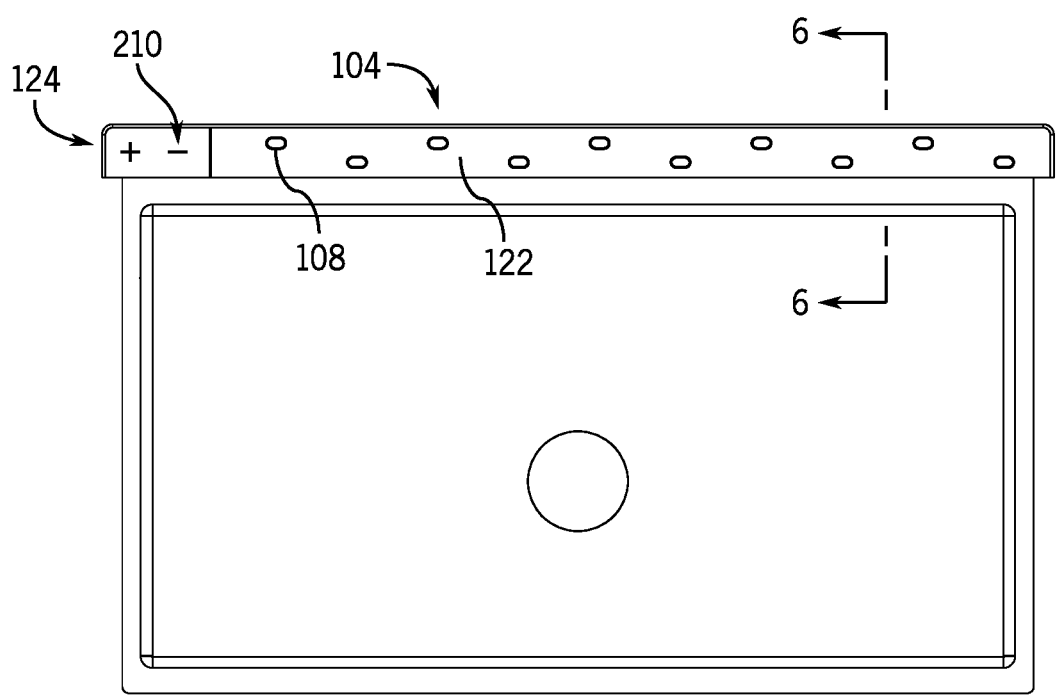
FIG. 5 is a bottom view of the smart sink of FIG. 1, according to an exemplary embodiment.

The speaker system 202 includes a subwoofer 208 disposed centrally within the volume 106 of the apron 104. According to an exemplary embodiment, the subwoofer 208 is configured to project sound downwards through a lower wall 122 of the apron 104 (e.g., a lower wall 122 extending from the forward wall 120 in a substantially perpendicular orientation relative to the forward wall 120, a lower wall 120 spaced apart from the top flange 116 and oriented in a substantially parallel orientation relative to the top flange 116). As shown in FIG. 5, the lower wall 122 of the apron 104 is perforated with a plurality of openings 108 staggered along a lateral extent of the lower wall 122. The size, number, and arrangement of openings 108 may be different in various exemplary embodiments. In other embodiments, the lower wall may include a mesh material (e.g., speaker grill fabric). In some embodiments, the lower wall may be detachably coupled (e.g., removably coupled) to the apron 104, which, advantageously, provides access to the components of the apron module 200 during maintenance events. According to other embodiments, the subwoofer 208 may be provided at different locations within the apron 104 and may direct sound through different types of openings or meshes.

Figure 6:
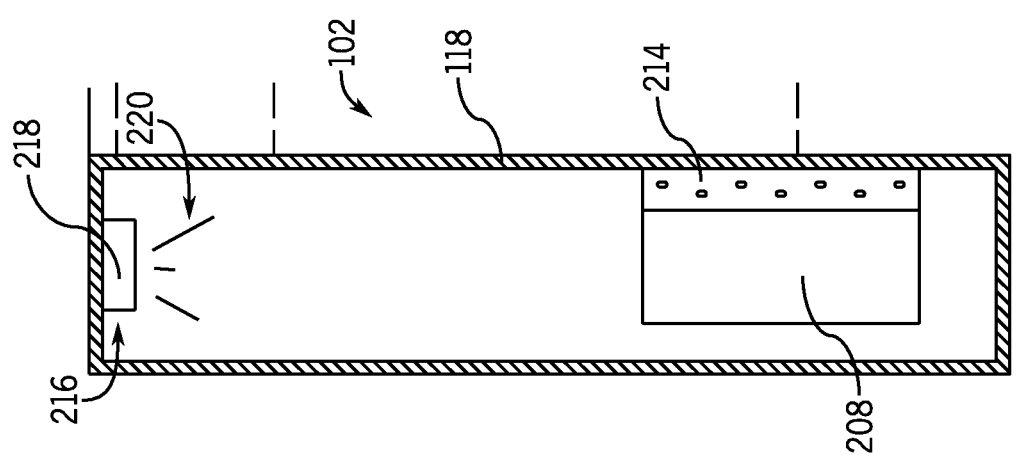
FIG. 6 is a side cross-sectional view of the smart sink of FIG. 1, according to an exemplary embodiment.

As shown in FIG. 5, the apron module 200 (see also FIG. 4) includes a user interface including volume control buttons 210 for the speaker system 202. The volume control buttons 210 are laser etched into the lower wall 122, proximate to a lateral end 124 of the lower wall 122. Among other benefits, positioning the volume control buttons 210 along the lower wall 122 hides the buttons 210 and improves the overall aesthetic appearance of the device. In other embodiments, the user interface may be disposed in a different location along the sink and accessible from a surface of the sink. The volume control buttons 210 may include a capacitor (e.g., a capacitive interface, a capacitive touch sensor, etc.) in which the control functions are activated by touching a surface of the apron 104, or another form of volume control device known to those of ordinary skill in the art. The position, type, and configuration of user controls may be different in various other embodiments. For example, the user controls may be located on the forward wall 120 of the apron 104, the top flange 116, or another location (see also FIG. 1). As shown in FIG. 6, another piece of insulating material 214 is disposed between the front sidewall 118 of the basin 102 and the subwoofer 208.

Returning to FIG. 4, the apron module 200 also includes a microphone 211 configured to receive user commands. The microphone 211 is disposed on a control module 213 (e.g., a circuit board, etc.) of the apron module 200. Alternatively, the microphone 211 may be disposed remotely from the control module 213.

The apron module 200 additionally includes an indicator 216. The indicator 216 includes a light source 218 (e.g., a light emitting diode (LED), an LED strip, etc.) configured to project light 220 downward through the lower wall 122 of the apron 104. Light 220 from the light source 218 is reflected against the inner surfaces of the apron 104 and out through the openings 108 in the lower wall 122 (see FIG. 5). As shown in FIG. 1, the light 220 projects downward onto the outer surfaces of the cabinets surrounding the sink 100. According to other embodiments, a different number of indicators may be used, and such indicators may have any of a variety of different sizes, shapes, colors, configurations, and positions on the apron 104.

According to an exemplary embodiment, the light 220 functions as an indicator light for the apron module 200. The light 220 may be configured to provide an indication of the operating status of the apron module 200. In some embodiments, the light 220 may be configured to operate similarly to the indicator on a "smart" home device (e.g., an Amazon Echo smart hub, etc.), which alerts a user when the device is ready to receive commands or when the device is executing commands. The light 220 may also function as an external night light in the kitchen area. The light 220 may at least partially illuminate a portion of the floor proximate to the sink 100. The position of the light source 218 may be different in various exemplary embodiments. In some embodiments, the light source 218 may be positioned along an upper edge of the sink 100 (see also FIG. 1) or beneath a rim of the sink 100 and provide light to the basin 102. The light source 218 may be configured to illuminate the faucet during operation. In some implementations, the light source 218 may be configured to coordinate an amount of lighting (e.g., an intensity) or color of lighting with user operations (e.g., the light source 218 may only activate when the sink 100 turns on or may turn a different color depending on what sink device is being used).

Figure 7:
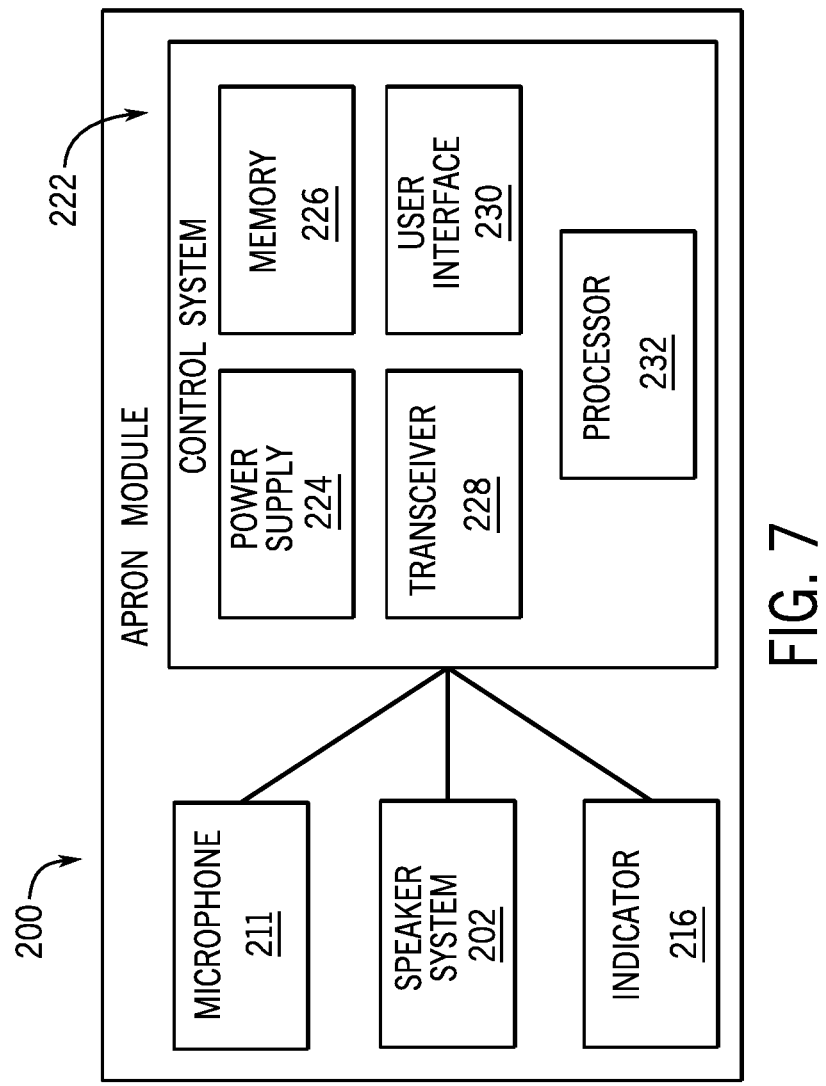
FIG. 7 is a schematic diagram of an apron module, according to an exemplary embodiment.

Referring now to FIG. 7, a schematic diagram of the apron module 200 is shown according to an exemplary embodiment. The apron module 200 includes a control system 222 (see also FIGS. 1 and 4) operably coupled to the speaker system 202, the microphone 211, and the indicator 216. The control system 222 includes a power supply 224, a memory 226, a transceiver 228, a user interface 230, and a processor 232. In alternative embodiments, the control system 222 may include additional, fewer, and/or different components. The transceiver 228 is configured to transmit and receive data for the apron module 200 (e.g., to communicate with other "smart" home devices, etc.). The user interface 230 may include wiring connectors, dip switches, or other parts of circuit board. In some embodiments, the user interface 230 may include a display or control buttons coupled to the sink 100 and configured to facilitate user interaction with the apron module 200. The display may be configured as part of the entertainment system (e.g., to display real-time video from wirelessly connected camera, to display pictures, to display the operational status of sink devices, etc.). The processor 232 is operably coupled to, and configured to coordinate interaction between, the various control system 222 components. According to an exemplary embodiment, the control system 222 includes a "smart" home device.

Figure 8:
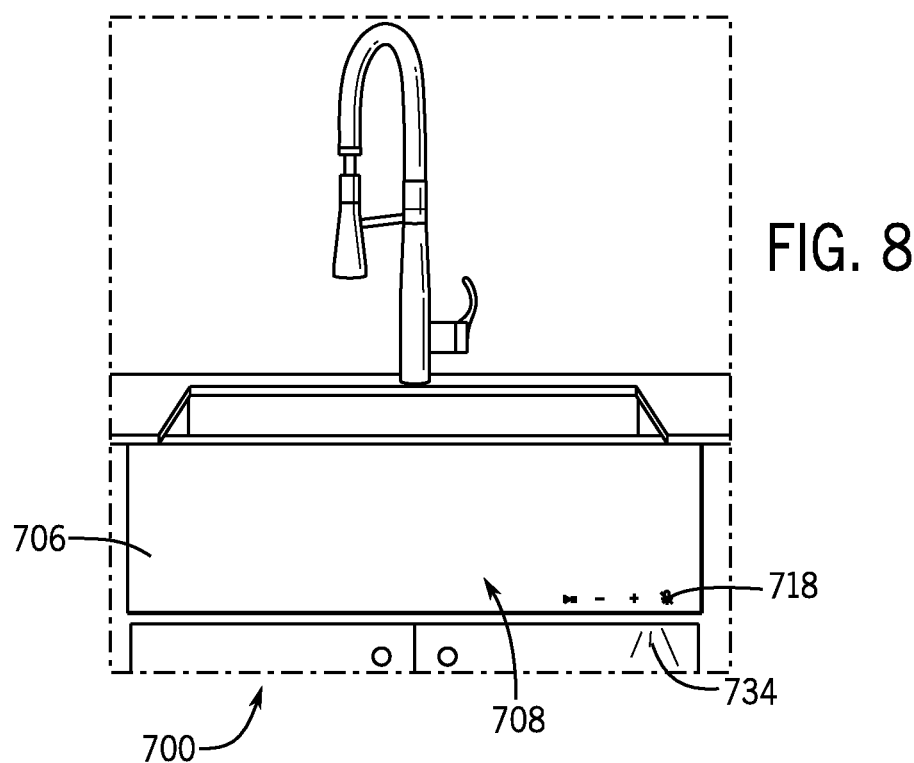
FIG. 8 is a front view of a smart sink, according to another exemplary embodiment.
Figure 9:
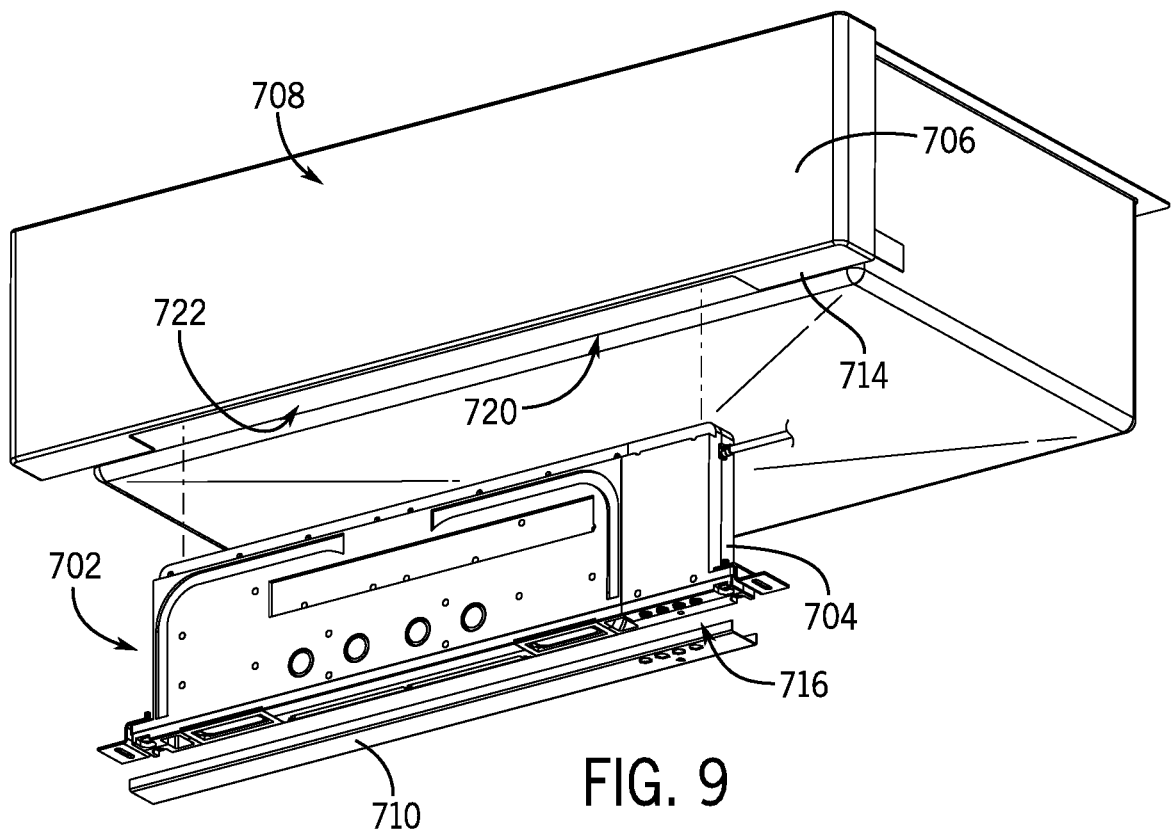
FIG. 9 is an exploded view of the smart sink of FIG. 8.

The arrangement of components described with reference to FIGS. 1, and 3-6 should not be considered limiting. Many alternatives are possible without departing from the inventive concepts described herein. For example, FIGS. 8-9 show a smart sink 700 that includes a single-piece apron module 702, according to an exemplary embodiment. In other words, the apron module 702 is formed as a single unitary body that includes a control system, speaker system, microphone, and indicator that are all enclosed (e.g., housed) within a single housing 704 (e.g., enclosure, insert, housing body, etc.), within an enclosed space defined by the housing 704. Among other benefits, the smart sink 700 is designed to have a similar appearance as standard sinks that do not include an apron module (e.g., elements of the apron module 702 are not visible by a user that is standing in front of the smart sink 700). There are no speakers, grills, or interface on the forward wall 706 of the apron 708. Instead, the speaker grill 710 is disposed on a lower wall 714 of the apron 708 such that the speaker grill 710 at least partially defines the lower wall 714. A user interface 716 (e.g., buttons for control commands for the apron module 702 such as a mute button, a volume control button, a power button, etc.) are also disposed along the lower wall 714. As shown in FIG. 8, icons 718 (e.g., identifying symbols, etc.) for the various controls of the user interface 716 are disposed on the forward wall 706, on a forward surface of the forward wall 706, for identifying the location of the controls. The icons 718 may be printed, laser etched, or otherwise formed onto the forward surface. In other embodiments, the locations of the user interface 716 and/or icons 718 may be different.

As shown in FIG. 9, the apron module 702 is accessible through the lower wall 714 of the apron 708 and is removable from the apron 708. The lower wall 714 of the apron 708 defines an opening 720 (e.g., slot, etc.) that provides access to a volume 722 of the apron 708. The volume 722 is sized to receive the apron module 702 therein.

FIG. 10 shows the user interface 716 of the apron module 702 of FIGS. 8-9. the user interface 716 includes a plurality of control buttons configured to facilitate user interaction with the apron module 702, including a play/pause button 724 configured to pause playback of music through the speaker system and/or other controller activities, a volume down button 726 to decrease the volume of sound from the speaker system, a volume up button 728 to increase the volume, and a microphone mute button 730 to disable the microphone of the apron module 702. The user interface 716 additionally includes an indicator 732 including a light source (e.g., a light emitting diode (LED)) configured to project light 734 vertically downward (e.g., toward the floor and/or cabinet) from the lower wall 714 of the apron 708 (see also FIG. 8). In other embodiments, the location of the control buttons and indicator 732 may be different. In yet other embodiments, the control buttons may be replaced with at least one touchless sensor (e.g., a capacitive sensor) or another proximity-based sensor disposed along a wall of the apron 708.

As shown in FIG. 9, the housing 704 is sized and shaped to fit within the volume 722. The housing 704 is thin rectangular panel and may define openings through which sound may be transmitted from the speaker system. The sound is transmitted from the housing 704 through a grill 710 that is coupled to the housing 704 and disposed along the lower wall 714. The housing 704 is separable from the apron 708. In some embodiments, the apron module 702 may be used as a standalone device (e.g., "smart" hub) in locations remote from the apron 708.

Figure 12:
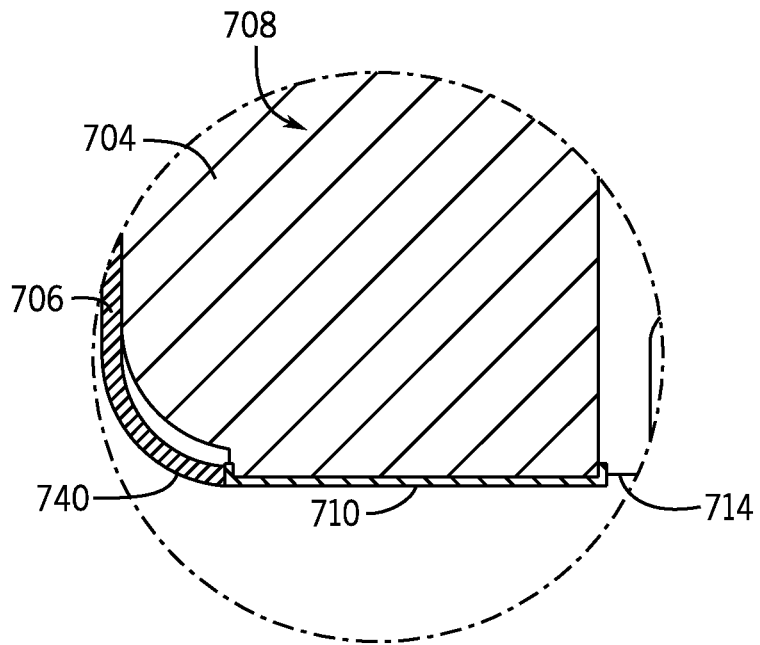
FIG. 12 is a reproduction of FIG. 11 near a lower wall of the apron.
Figure 13:
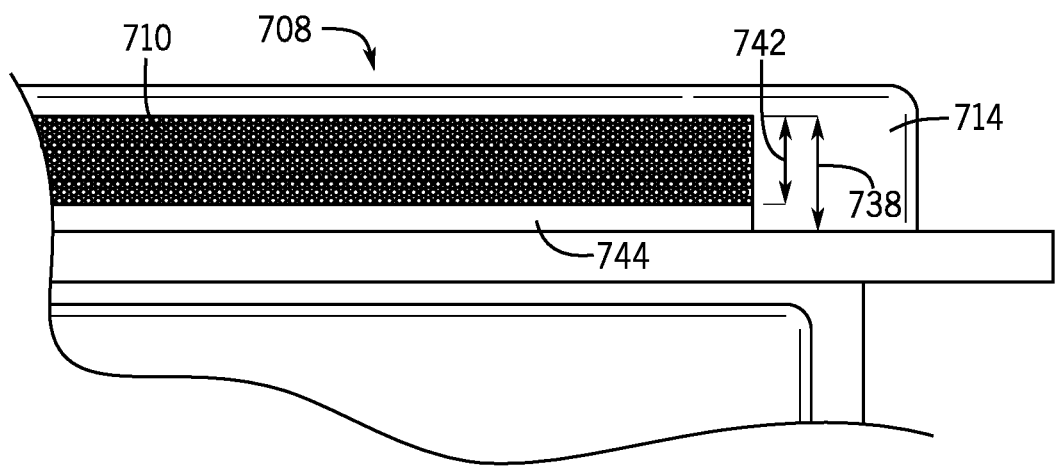
FIG. 13 is a bottom view of the apron of FIG. 11.

FIGS. 11-13 shows a side cross-sectional view through the smart sink 700 of FIGS. 8-9. The apron 708 fits at least partially over a vertical wall of the cabinet, which is "sandwiched" or otherwise disposed between the apron 708 and a front sidewall of the smart sink. The apron module 702 is at least partially disposed within the volume 722 and abuts the forward wall 706. The apron module 702 may be coupled to the forward wall 706 or to another interior surface of the apron 708. In some embodiments, the housing 704 is bonded to the apron 708 using an adhesive product. In other embodiments, the housing 704 includes magnets to couple the apron module 702 to the apron 708. In yet other embodiments, the housing 704 is coupled to apron 708 using a mechanical fastener (e.g., bolts, screws, brackets, etc.). As shown in FIG. 11, a width 736 of the housing 704, between the forward wall 706 and the cabinet is smaller than a width 738 of the opening 720. The forward wall 706 defines a lower lip 740 (e.g., flange, etc.) that extends toward the opening 720 and is configured to help retain the housing 704 within the apron 708 (e.g., to prevent the housing 704 from separating from the apron 708).

Figure 15:
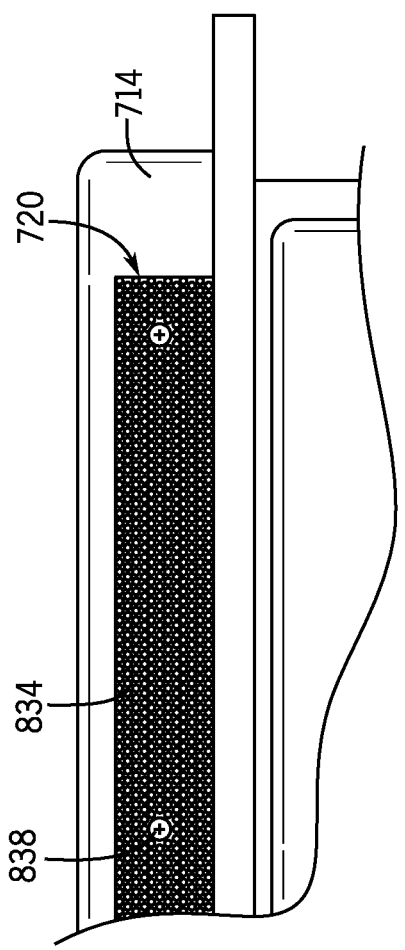
FIG. 15 is a bottom view of the apron of FIG. 14.
Figure 14:
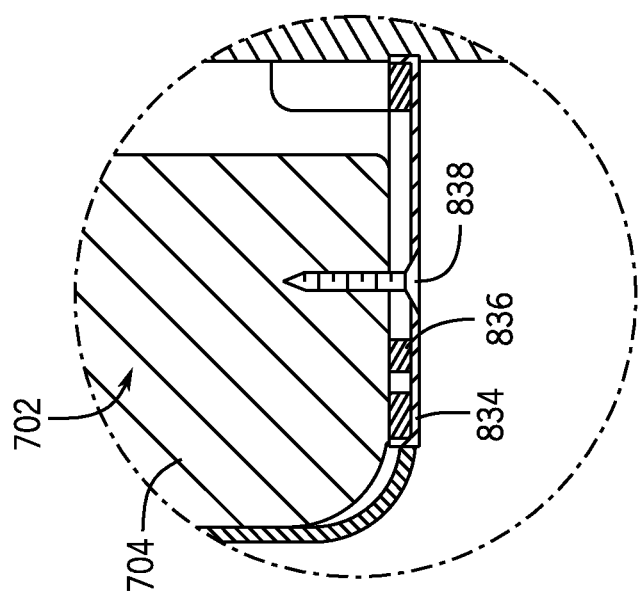
FIG. 14 is a side cross-sectional view through a portion of an apron of a smart sink, according to another exemplary embodiment.

As shown in FIGS. 11-13, the housing 704 includes a grill 710 that is mechanically connected to a lower end of the housing 704 (e.g., via a press-fit connection) and is substantially flush with the lower wall 714. As shown in FIG. 13, a width 742 of the grill 710 is less than the width 738 of the opening 720 in the lower wall 714 such that a gap is formed between an edge 744 of the grill 710 and the cabinet. Among other benefits, the press-fit connection between the grill 710 and the housing 704 eliminates the need for mechanical fasteners (e.g., screws, bolts, etc.) and improves the overall aesthetic of the lower wall 714. In other embodiments, the size, shape, and/or arrangement of the grill 710 may be different. For example, FIGS. 14-15 show a grill 834 that is mechanically fastened (e.g., via screws, bolts, etc.) to the housing 704. Again, the grill 834 is substantially flush with the lower wall 714 of the apron 708. The grill 834 includes a frame 836 that is structured to support the grill 834 and to prevent the grill 834 from bending or otherwise deforming in the area of the fasteners 838. As shown in FIG. 14, the frame 836 is disposed along an upper surface of the grill 834, between the grill 834 and the housing 704. The grill 834 is approximately the same size as the opening 720 and fully occupies the opening 720.

Figure 17:
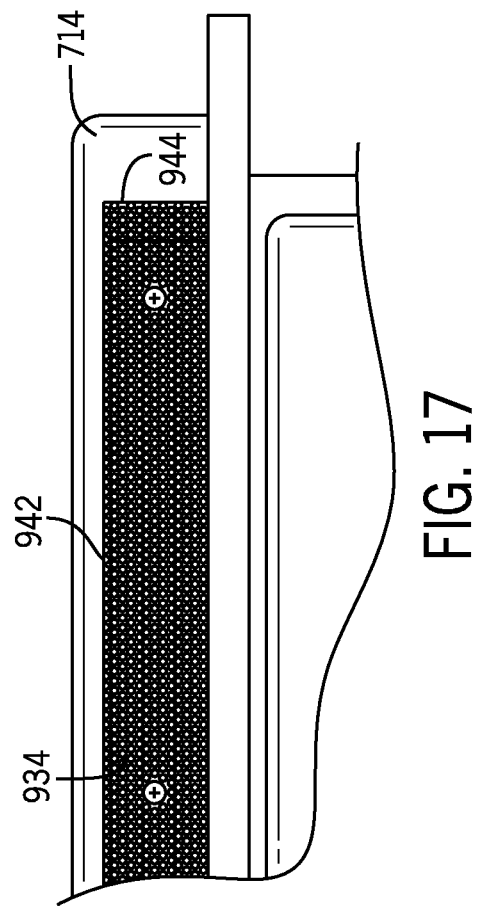
FIG. 17 is a bottom view of the apron of FIG. 16.
Figure 16:
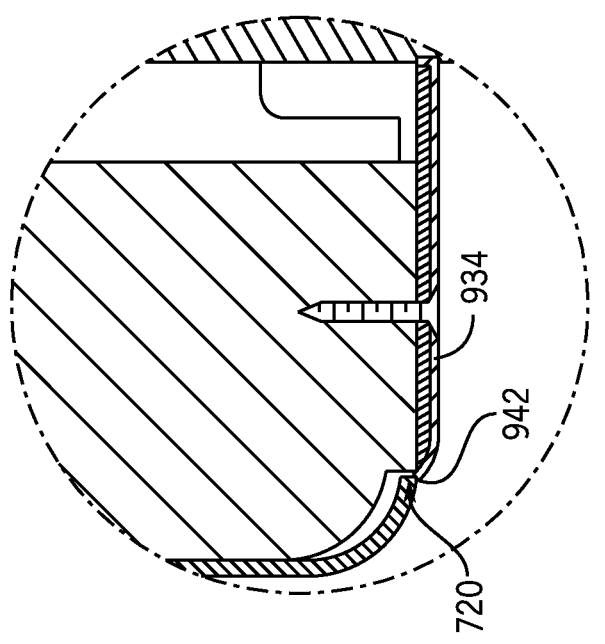
FIG. 16 is a side cross-sectional view through a portion of an apron of a smart sink, according to another exemplary embodiment.
Figure 19:
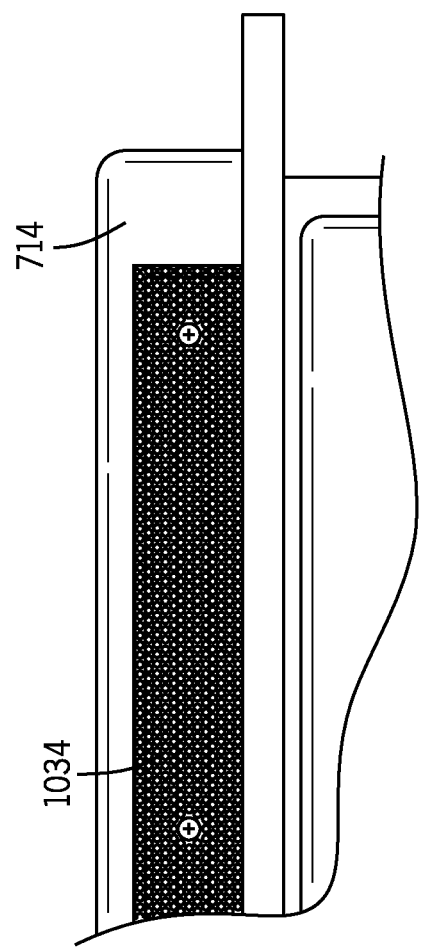
FIG. 19 is a bottom view of the apron of FIG. 18.
Figure 18:
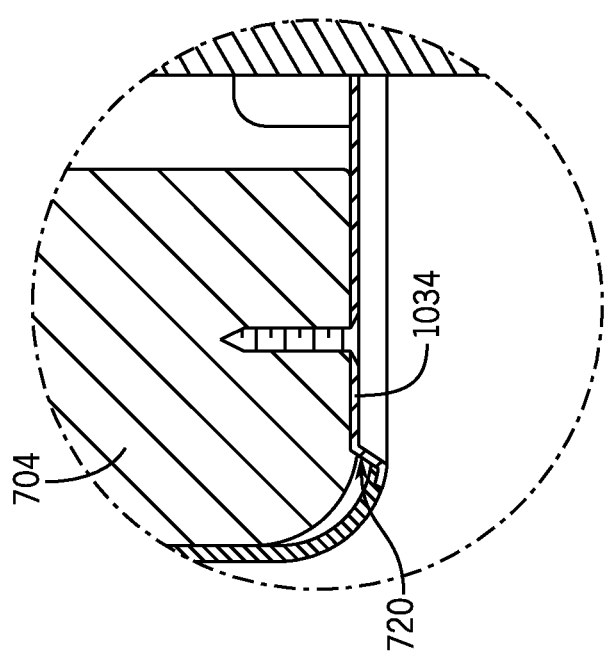
FIG. 18 is a side cross-sectional view through a portion of an apron of a smart sink, according to another exemplary embodiment.

FIGS. 16-18 show a grill 934 according to another exemplary embodiment. The grill 934 extends beyond the opening 720 on at least two ends of the opening 720. The forward end 942 and the lateral ends 944 of the grill 934 are bent or otherwise deformed to eliminate any sharp edges where the grill 934 engages the opening 720. FIGS. 18-19 show yet another exemplary embodiment of a grill 1034. As shown in FIGS. 18-19, the grill 1034 is at least partially recessed into the opening 720 and abuts a lower end of the housing 704 (e.g., such that an upper surface of the grill 1034 is approximately co-planar with a lower surface of the housing 704). Among other benefits, the structure of the grill 1034 of FIGS. 18-19 eliminates the need for a separate frame or supporting structure to prevent deformation of the grill 1034 when tightening the mechanical fasteners.

FIGS. 20-21 show sinks 400 and 500, respectively including an apron module 402 and 502, where at least one of the speakers and indicator are coupled to a forward wall 420 and 520 of an apron 404 and 504. In the embodiment of FIG. 20, a set of speakers 406 is forward facing such that sound is projected away from the forward wall 420 toward a user of the sink 400. The position and configuration of the indicator may also be different in various exemplary embodiments. As shown in FIG. 20, an indicator 408 of the apron module 402 includes a plurality of lights 410 (e.g., three lights 410) disposed on the forward wall 420 of the apron 404. The lights 410 may be configured to animate (e.g., to illuminate in a pattern), and change color or intensity depending on an operational status of the apron module 402.

As shown in FIG. 21, an indicator 506 includes an elongated light source 507 (e.g., LED strip, etc.) extending laterally along the forward wall 520 of the apron 504 and configured to project light away from the forward wall 520 of the apron 504 toward a user. Additionally, the sink 500 includes a display 508 coupled to a forward wall 520 of the apron 504. In some embodiments, the display 508 may be configured to provide wireless viewing of cameras located in other parts of the house (e.g., wirelessly connected cameras, etc.). For example, in response to a user command (e.g., "drop-in on the kids"), the sink 500 may connect the display to the selected wireless camera (e.g., nursery, play room, bed room, etc.). The user may take further action, based on their observations, without having to leave the sink 500 (e.g., the user may ask the sink 500 to turn off lights in an unoccupied room, or to activate a speaker in a room to project the users voice to room occupants, to catch an infant escaping a crib, etc.). The display 508 may also be used to "drop-in" or connect to a camera on a front door/driveway area to see who is outside of their house from a safe position. It will be appreciated that the functionality of the display 508 may be combined with any of the functionality described with reference to FIG. 2.

Figure 23:
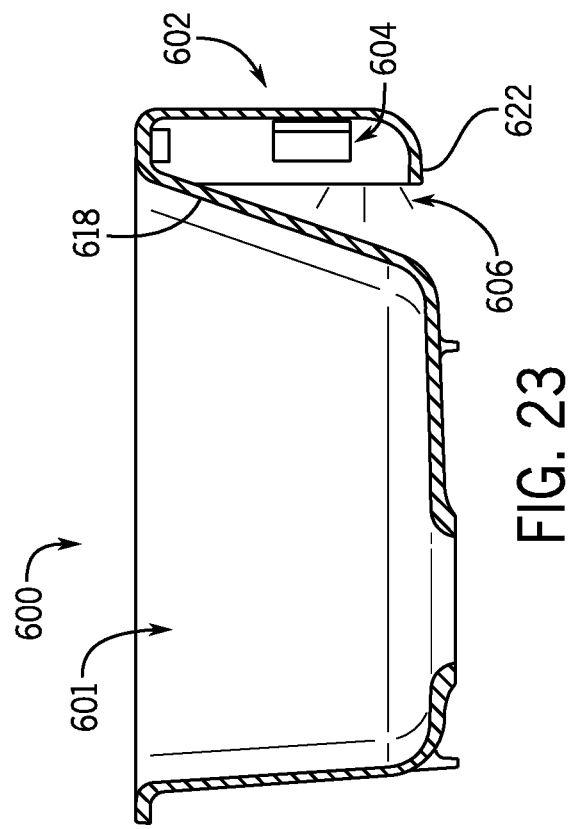
FIG. 23 is a side cross-sectional view of the smart sink of FIG. 22, according to an exemplary embodiment.
Figure 22:
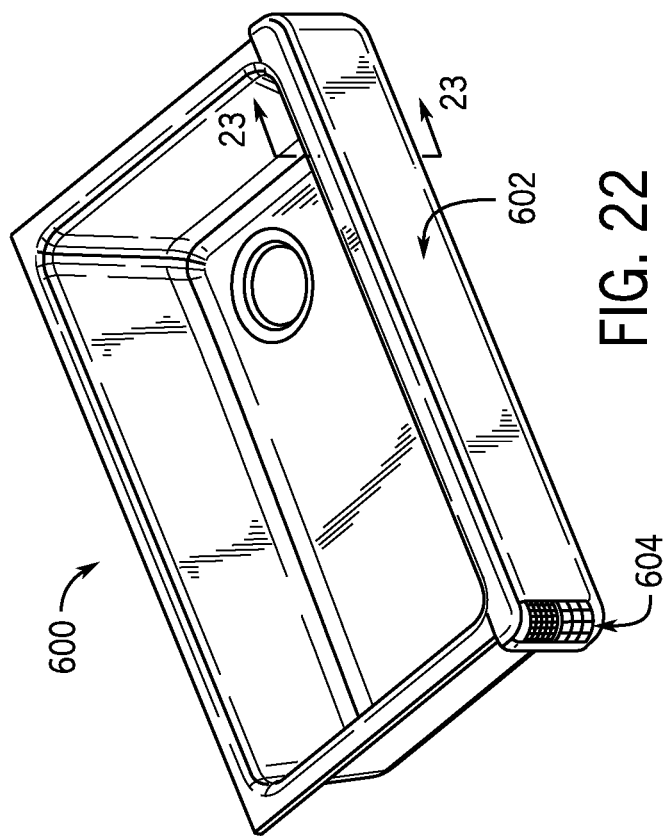
FIG. 22 is a front perspective view of a smart sink, according to another exemplary embodiment.

The apron module may be configured for use with a variety of different sink types and apron designs. FIGS. 22-23 show a sink 600 including an apron 602 having a curved lower wall 622. The sink 600 includes an apron module 604 configured to project light 606 and sound toward a front sidewall 618 of a basin 601 of the sink 600 (e.g., away from a user of the sink 600), which may be reflected against the front sidewall 618 toward a space around or beneath the sink 600.

It is important to note that the construction and arrangement of the elements of the sink as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies described herein may be constructed from any of a wide variety of materials that provide sufficient strength or durability, in any of a wide variety of colors, textures, and combinations.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. Other substitutions, modifications, changes, and omissions may be made in the design, operating conditions, and arrangement of the preferred and other exemplary embodiments without departing from the spirit of the present disclosure.

What is claimed is:

1. A sink assembly, comprising:
 a basin comprising a floor and a plurality of sidewalls extending upwardly from the floor, the floor and the plurality of sidewalls defining a reservoir that is configured to receive fluid therein;
 an apron spaced apart from a front sidewall of the plurality of sidewalls of the basin to form a volume therebetween, the apron including a lower wall, the apron further including perforations in the lower wall to allow sound to be directed through the apron; and
 an apron module disposed within the volume, the apron module comprising an insert that is removably coupled to the apron and an audio system that is housed within the insert,
 wherein the insert further comprises a housing having a housing body that defines an at least partially enclosed space, and wherein the audio system is coupled to the housing body and disposed at least partially within the enclosed space,
 wherein the perforations are in the form of a grill that is coupled to the housing body, and wherein the grill defines a portion of a lower wall of the apron when the apron module is engaged with the sink assembly.

2. The sink assembly of claim 1, wherein the apron module is sized to be fully received within the volume.

3. The sink assembly of claim 1, wherein the apron comprises a top flange extending outwardly from a top portion of the front sidewall and a forward wall extending downwardly from the top flange, wherein the apron module is coupled to the forward wall.

4. The sink assembly of claim 3, wherein the lower wall extends from the forward wall in a perpendicular orientation relative to the forward wall, wherein the lower wall defines an opening providing access to the volume.

5. The sink assembly of claim 4, wherein the opening is sized to receive the apron module therein.

6. The sink assembly of claim 1, wherein the audio system comprises at least one component selected from the group consisting of a speaker, a surface transducer, and a microphone.

7. The sink assembly of claim 1, wherein the apron module further comprises a virtual assistant.

8. The sink assembly of claim 1, wherein the apron module further comprises a control system operably coupled to the audio system, wherein the control system comprises a processor and a user interface operably coupled thereto, and wherein the user interface is accessible from a surface of the apron.

9. The sink assembly of claim 8, wherein the user interface comprises an indicator having a light source that is configured to illuminate an area adjacent the sink assembly.

10. The sink assembly of claim 9, wherein the light source projects light away from the lower wall of the apron when the when the housing apron module is coupled to the apron.

11. The sink assembly of claim 1, wherein the apron module further comprises a control system operably coupled to the audio system, wherein the control system comprises a transceiver that is configured to communicatively couple to the apron module to a sink device disposed remote from the apron module, and wherein the sink device comprises at least one of a faucet, a garbage disposal, a soap dispenser, a water filtration system, a self- cleaning sink mechanism, or a dish rinsing device.

12. The sink assembly of claim 1, wherein the grill is flush with the lower wall.

13. The sink assembly of claim 1, wherein the grill is spaced apart from the front sidewall of the basin forming a gap therebetween.

14. The sink assembly of claim 1, wherein the lower wall defines an opening, and wherein a width of the housing perpendicular to the front sidewall of the basin is less than a width of the opening.

15. The sink assembly of claim 1, wherein the apron includes a forward wall spaced apart from the front sidewall of the basin, the forward wall defining a lip that extends rearward toward the front sidewall.

16. A sink assembly, comprising:
 a basin comprising a floor and a plurality of sidewalls extending upwardly from the floor, the floor and the plurality of sidewalls defining a reservoir that is configured to receive fluid therein;
 an apron spaced apart from a front sidewall of the basin to form a volume; and
 an apron module disposed within the volume, the apron module comprising an audio system,
 wherein the apron module further comprises a housing having a housing body that defines an at least partially enclosed space, and wherein the audio system is coupled to the housing body and disposed substantially within the enclosed space, and
 wherein the housing further comprises a grill that is coupled to the housing body, and wherein the grill defines a portion of a lower wall of the apron when the apron module is engaged with the sink assembly.

17. The sink assembly of claim 16, wherein the grill is flush with the lower wall.

18. The sink assembly of claim 16, wherein the grill is spaced apart from the front sidewall of the basin forming a gap therebetween.

19. The sink assembly of claim 16, the apron including perforations to allow sound to be directed through the apron, wherein the perforations are disposed along at least one of the lower wall, a side wall, or a top flange of the apron.

* * * * *